United States Patent
Schneider et al.

(10) Patent No.: US 10,333,233 B2
(45) Date of Patent: Jun. 25, 2019

(54) ELECTRICAL CONNECTOR ELEMENT

(71) Applicant: FEW Fahrzeugelektrikwerk GmbH & Co. KG, Zwenkau (DE)

(72) Inventors: Björn Schneider, Markkleeberg (DE); Felix Tischer, Leipzig (DE); David Roger, Leipzig (DE)

(73) Assignee: FEW Fahrzeugelektrikwerk GmbH & Co. KG, Zwenkau (DE)

( * ) Notice: Subject to any disclaimer, the term of this patent is extended or adjusted under 35 U.S.C. 154(b) by 0 days.

(21) Appl. No.: 15/846,716

(22) Filed: Dec. 19, 2017

(65) Prior Publication Data

US 2018/0183157 A1 Jun. 28, 2018

(30) Foreign Application Priority Data

Dec. 28, 2016 (DE) .......................... 10 2016 125 781

(51) Int. Cl.
*H01B 5/08* (2006.01)
*H01R 4/62* (2006.01)
(Continued)

(52) U.S. Cl.
CPC .............. *H01R 4/625* (2013.01); *B23K 35/24* (2013.01); *H01R 4/02* (2013.01); *H05B 3/84* (2013.01);
(Continued)

(58) Field of Classification Search
CPC ....................................................... H01B 5/08
(Continued)

(56) References Cited

U.S. PATENT DOCUMENTS 3,368,114 A * 2/1968 Campbell ......... H01L 23/49541
174/541
3,519,890 A * 7/1970 Ashby ................. H01L 23/4822
174/253
(Continued)

FOREIGN PATENT DOCUMENTS

DE 20203202 6/2002 ............... H01R 4/18
DE 102004057630 3/2006 ............. B23K 1/002
(Continued)

OTHER PUBLICATIONS

Notification Concerning Transmittal of International Preliminary Report on Patentability (Chapter I of the Patent Cooperation Treaty), in English, dated Mar. 23, 2017, which was issued by the International Bureau of WIPO in Applicant's related international PCT application having Serial No. PCT/EP2015/070730, filed on Sep. 10, 2015.
(Continued)

*Primary Examiner* — Chau N Nguyen
(74) *Attorney, Agent, or Firm* — Bodner & O'Rourke, LLP; Gerald T. Bodner; Christian P. Bodner

(57) ABSTRACT

The invention relates to an electrical connector element for contacting a conductive structure arranged on a flat carrier wherein the contacting is performed by a thermally bonded connecting material, wherein devices for fixing an advantageously flexible conductor are arranged on one side, wherein the connector element is configured as a soldering base or soldering bridge with a connector portion, characterized in that at least a portion of the soldering base or of the soldering bridge that is to be connected with the conductive structure is configured as a fanned area and includes at least two bars that are offset from each other by a slot.

17 Claims, 3 Drawing Sheets

(51) Int. Cl.
  *H01R 4/02* (2006.01)
  *B23K 35/24* (2006.01)
  *H05B 3/84* (2006.01)
  *H01R 12/57* (2011.01)

(52) U.S. Cl.
  CPC ........ *H01R 12/57* (2013.01); *H05B 2203/016* (2013.01)

(58) Field of Classification Search
  USPC ...................................................... 174/94 R
  See application file for complete search history.

(56) References Cited

U.S. PATENT DOCUMENTS

| | | | |
|---|---|---|---|
| 3,813,519 A | 5/1974 | Jochim et al. ................ 219/522 |
| 3,839,782 A * | 10/1974 | Lincoln ............. H01L 23/49551 257/E23.047 |
| 4,199,214 A | 4/1980 | Pearce, Jr. et al. ....... 439/620.26 |
| 4,415,116 A | 11/1983 | Norton ..................... 228/180.21 |
| 4,907,991 A * | 3/1990 | Kobayashi ........... H05K 3/4685 29/843 |
| 5,148,262 A * | 9/1992 | Ahonen ................... H01R 4/68 174/125.1 |
| 5,738,554 A | 4/1998 | Borger et al. ................. 439/874 |
| 6,075,286 A * | 6/2000 | Ewer ................ H01L 23/49562 257/666 |
| 6,095,405 A | 8/2000 | Kim et al. .............. 228/180.21 |
| 6,267,630 B1 | 7/2001 | Machado .................... 439/876 |
| 6,307,253 B1 * | 10/2001 | Yamamoto ........ H01L 23/49562 257/666 |
| 6,315,575 B1 * | 11/2001 | Kajimoto ............. H01L 31/188 136/256 |
| D470,395 S | 2/2003 | Valiulis et al. ................ D8/373 |
| 6,730,848 B1 | 5/2004 | Antaya et al. ................. 174/78 |
| 6,870,134 B2 | 3/2005 | Sol et al. ...................... 219/203 |
| 7,134,201 B2 | 11/2006 | Ackerman et al. ............. 29/857 |
| 7,270,548 B2 | 9/2007 | Jenrich et al. .................. 439/34 |
| 7,301,126 B2 | 11/2007 | Mann ........................... 219/203 |
| D559,658 S | 1/2008 | Wohlford et al. ............. D8/354 |
| 8,278,609 B2 | 10/2012 | Reul ............................ 219/617 |
| 8,449,339 B2 * | 5/2013 | Krishnan ................ H01L 24/40 439/884 |
| 8,853,533 B2 | 10/2014 | Jenrich .......................... 174/50 |
| D717,636 S | 11/2014 | Stanley .......................... D8/363 |
| D718,253 S | 11/2014 | Zerebilov et al. ........... D13/154 |
| 8,905,778 B2 | 12/2014 | Jenrich et al. ............... 439/371 |
| 8,932,074 B2 | 1/2015 | Jenrich et al. ............... 439/371 |
| D727,268 S | 4/2015 | Buck et al. .................. D13/154 |
| D727,852 S | 4/2015 | Buck et al. .................. D13/154 |
| 9,155,206 B2 | 10/2015 | Rateiczak et al. |
| D748,063 S | 1/2016 | Buck et al. .................. D13/154 |
| D750,030 S | 2/2016 | Zerebilov et al. ........... D13/154 |
| 9,379,458 B2 | 6/2016 | Jenrich |
| D762,777 S | 8/2016 | Szucs et al. .................. D20/42 |
| D786,052 S | 5/2017 | Szucs et al. .................. D8/373 |
| D790,471 S | 6/2017 | Buck et al. .................. D13/147 |
| D791,578 S | 7/2017 | Royak ........................... D8/354 |
| 2001/0002340 A1 * | 5/2001 | Eldridge ............ G01R 1/06727 439/66 |
| 2006/0102610 A1 | 5/2006 | Hoepfner et al. ............. 219/203 |
| 2007/0099073 A1 * | 5/2007 | White ................. H01M 2/1055 429/158 |
| 2009/0170380 A1 | 7/2009 | Lyon ............................ 439/874 |
| 2009/0277671 A1 | 11/2009 | Hahn ........................... 174/257 |
| 2010/0084050 A1 | 4/2010 | Kraemer et al. ................ 148/23 |
| 2010/0326983 A1 | 12/2010 | Sitterlet et al. ............... 219/635 |
| 2011/0104958 A1 | 5/2011 | Kwon et al. .................. 439/816 |
| 2012/0305311 A1 | 12/2012 | Jenrich ....................... 174/75 R |
| 2012/0318566 A1 | 12/2012 | Reul et al. .................... 174/255 |
| 2013/0043066 A1 | 2/2013 | Cholewa et al. ............. 174/257 |
| 2013/0232840 A1 | 9/2013 | Miller ............................ 40/757 |
| 2014/0110166 A1 | 4/2014 | Degen et al. ............... 174/84 R |
| 2014/0158424 A1 | 6/2014 | Schlarb et al. ............. 174/94 R |
| 2014/0182932 A1 | 7/2014 | Cholewa et al. ........... 174/84 R |
| 2015/0236431 A1 | 8/2015 | Schmalbuch et al. ........ 174/252 |
| 2017/0297130 A1 | 10/2017 | Jenrich |

FOREIGN PATENT DOCUMENTS

| | | | |
|---|---|---|---|
| DE | 102006047764 | 4/2008 | ............ B23K 35/26 |
| DE | 202011100906 U1 | 6/2011 | ............ H01R 11/28 |
| DE | 202015002764 U1 | 5/2015 | ............... H01R 4/02 |
| DE | 102015003086 | 3/2016 | ............ B23K 1/002 |
| EP | 002669614-0001 | 4/2015 | ............................ 8/8 |
| EP | 003536416-0001 | 2/2017 | ............................ 8/8 |
| EP | 003536416-0002 | 2/2017 | ............................ 8/8 |
| WO | WO2012/152542 | 11/2012 | ............... H01R 4/62 |
| WO | WO 2016/038144 | 3/2016 | ............... B23K 1/00 |

OTHER PUBLICATIONS

English translation of the International Preliminary Report on Patentability (Chapter I of the Patent Cooperation Treaty), dated Mar. 14, 2017, which was issued by the International Bureau of WIPO in Applicant's related international PCT application having Serial No. PCT/EP2015/070730, filed on Sep. 10, 2015.
Written Opinion of the International Searching Authority, in English, dated Jan. 28, 2016, which was issued by the International Bureau of WIPO in Applicant's related international PCT application having Serial No. PCT/EP2015/070730, filed on Sep. 10, 2015.
International Search Report, in English, dated Jan. 28, 2016, which was issued by the International Bureau of WIPO in Applicant's related international PCT application having Serial No. PCT/EP2015/070730, filed on Sep. 10, 2015.

* cited by examiner

ELECTRICAL CONNECTOR ELEMENT

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not Applicable

STATEMENT REGARDING PRIOR DISCLOSURES BY THE INVENTOR OR A JOINT INVENTOR

Not Applicable

BACKGROUND OF THE INVENTION

(1) Field of the Invention

The invention relates to an electrical connector element for contacting a conductive structure arranged on a flat carrier wherein the contacting is provided by a thermally bonded connecting material wherein devices for fixing an advantageously flexible conductor are arranged on one side, wherein the connector element is configured as a soldering base or soldering bridge with a connector portion according to the preamble of claim 1.

(2) Description of Related Art

DE 20 2011 100 906 U1 discloses an electrical connector element for contacting a conductive structure that is arranged on a flat carrier, wherein the connector element is fixed by a thermally bonded connecting material, thus a solder. In particular the known solution is an electrical connector element for a window pane, in particular an automotive window pane. The window pane includes at least one electrical connector element for vehicles with electrically conductive structures, for example heating conductors or antenna conductors. These electrically conductive structures are connected by solders connectors with on board electronics. Due to different thermal expansion coefficients of the materials employed considerable mechanical tensions are generated by production and subsequent operations which can put stress on the window panes and can cause the window panes to fracture or can cause a destruction of the contact.

Materials that have been used so far have a high level of ductility which facilitates absorbing or compensating mechanical tensions between the electrical connector element and the window pane. Using solder that contains lead, however, has not been permissible for quite a while for health and environmental reasons and is therefore being avoided.

Since known lead free solders only have a limited amount of ductility at best, it has to be assured during production and/or subsequent operations that mechanical tensions occurring due to different expansion coefficients are avoided. A connector element is configured in DE 20 2011 100 906 U1 so that the connector element provides a solder base which is at least approximately shaped as a number 8 or which approximately has a circular ring shape.

In one embodiment the solder base is made from plural circular rings or circular ring segments which engage each other or contact each other. The connector element itself is advantageously made from an iron nickel or iron chromium alloy or a mix thereof.

DE 20 2015 002 764 U1 discloses another element for contacting a conductive structure arranged on a flat carrier with a thermally bonded connecting material. This contact element shall be used in particular for soldering by electro-magnetic induction heating and shall assure that local overheating during the soldering process is prevented. Furthermore even heating of the soldering partners shall be provided.

For this purpose a contact element is being used that is configured as a solder base made from at least two non engaging circular surfaces, circular rings, circular segments or similar configurations that are offset from each other by a connecting surface element.

Furthermore the soldering base advantageously includes protrusions to form a defined soldering gap outside of the connecting surface element. The actual materials for fixing the conductor are provided at or on the connecting surface element.

As stated supra the use of solder containing lead was stopped also in the field of contacting silver print on automotive glass panes due to environmental concerns. Only lead free solder may be used for this purpose.

In a solder alloy that includes lead the lead portion provides that the corresponding solder joint remains ductile after solidification, thus in solid condition. Thus the compound can absorb tensions due to the lead wherein the tensions are caused by thermal expansion. The tensions are substantial in view of the fact that typical copper materials that are used for connector elements expand much more than the actual glass substrate.

In order to facilitate a reduction of the thermal tensions caused by different thermal expansions it was already proposed to implement the connector elements, this means the respective soldering bases or soldering bridges with a material which has an expansion coefficient similar to glass.

A solution of this type has a positive effect on reducing the tension caused by the object to be soldered but it does not provide any improvement which is caused by the expansion of the solder itself.

When heating the solder and transferring it into liquid condition the solder expands as well. When the solder cools down to ambient temperature after heating and performs a transition from a liquid state into a solid state tension is generated at the substrate surface in the solder joint. This zone with tension weakens the substrate, in particular a glass element in this portion. Thus, the resistance of the glass is weakened.

BRIEF SUMMARY OF THE INVENTION

Therefore it is an object of the invention to provide an improved electrical contact element for contacting a conductive structure arranged on a flat carrier with a thermally bonded connecting material, this means a solder which provides that in spite of a lack of ductility of the solder during a state change and thus tensions that are being caused during subsequent operations and resulting from different thermal expansion coefficients are minimalized.

The object of the invention is achieved by the feature combination according to claim 1 and in combination with the method according to claim 16.

Dependent claims provide at least advantageous embodiments and improvements of the invention.

Accordingly an electrical connector element is provided for contacting a conductive structure that is arranged on a flat carrier using a thermally bonded connecting material, that means a solder, wherein devices for fixing a conductor are arranged or arrange able on one side of the contact element.

Furthermore the connector element is configured as a solder base or as a solder bridge. When configured as a solder bridge the connector element includes a connecting portion which has a defined distance from a surface of the flat carrier or substrate during a subsequent use of the connector element in order to fixate or attach necessary contacts for the electrical connection or the ends respective cables. In a simple solder base a non-soldered end of the solder base is the section where respective electrical contacting is performed, for example by using a cable shoe or by other connections with a connecting cable.

According to the invention at least the portion of the solder base or the solder bridge that is to be connected with the conductive structure e.g. a conductive print on a glass pane is configured fanned out. The fanning is provided by providing at least two bars that are offset by a slot.

According to an embodiment of the invention shapes are provided that originate from the bars and that reach into the slot. These shapes can be used for forming a contact surface for a soldering tool.

In an embodiment of the invention the bars have at least one bulge in a direction of their free end wherein the at least one bulge is provided for forming a defined solder gap at a bottom side oriented towards the conductive structure. The bulges can be implemented for example by embossing.

In an advantageous embodiment the solder base or the solder bridge is provided with a fanned area which includes three bars with two slots.

The center bar can include a shape that forms a contact surface for a soldering tool as recited supra.

Advantageously the width of the bars is in a range between 0.2 and 2 mm, advantageously in a range between 0.4 and 0.9 mm.

The materials thickness for the solder base or the solder bridge is in a range between 0.4 and 0.8 mm.

It is another essential aspect of the invention that a minimum amount of a lead free connecting material, this means solder is useable when employing the configuration of the solder base or the solder bridge according to the invention.

This minimum amount in combination with the recited sizes is in a range between 2 $mm^3$ and 12 $mm^3$ advantageously in a range between 3 $mm^3$ and 6 $mm^3$ of lead free connecting material.

The solder gap provided by the bulge is in a range between 0.5 mm and 0.8 mm, advantageously at 0.7 mm.

The material of the connector element is advantageously made from an iron-nickel or iron-chromium alloy or a mix thereof. Advantageously FeNi 48 is used.

As matter of principle the difference of the thermal expansion coefficients of the connector element and the flat carrier, in particular glass is to be set at a minimum value. Under this aspect a suitable alloy has to be selected for the soldering base or the soldering bridge for known expansion coefficients of the carrier material.

According to the invention the tension between the soldering base or the soldering bridge and the flat carrier is reduced by at least half compared to non-fanned embodiments of a soldering base or a soldering bridge.

Particularly advantageously hot air soldering can be used when using the connector elements according to the invention.

By specifying the solder amount to a minimum the effect of expansion and contraction is reduced compared to the prior art. When the employed solder contracts the mechanical energy can be transmitted to the bars of the solder bridge or the solder base or the solder can expand and contract between the bars. The tension in a direction towards the substrate is reduced substantially. The advantageous hot air soldering provides even heating of all components. Eventually the substrate is less sensitive to mechanical loads when using connector elements according to the invention.

Surprisingly comprehensive tests have shown that a solder bridge with plural bars has a sufficient current carrying capability and a sufficient pull off force in addition to the minimum loading of the substrate. These advantages are relevant in particular when a solder bridge with three bars per solder bridge side, the minimum amount of solder recited supra and hot air soldering are being used.

The invention is subsequently described based on an embodiment with reference to drawing figures, wherein:

BRIEF DESCRIPTION OF THE SEVERAL VIEWS OF THE DRAWINGS(S)

DETAILED DESCRIPTION OF THE INVENTION

In the figures electrical connector elements configured as soldering bridges are being used. The soldering bridges include a connecting portion or a connecting element 1. At the connecting element non illustrated connecting wires or similar connecting devices are contacted. Starting from the connecting element 1 portions 2 extend that are fanned on both sides.

In particular the perspective figures show that the fanned portion also extends at least partially into a transition portion 3 with reference to the connector element 1.

Figure 1:
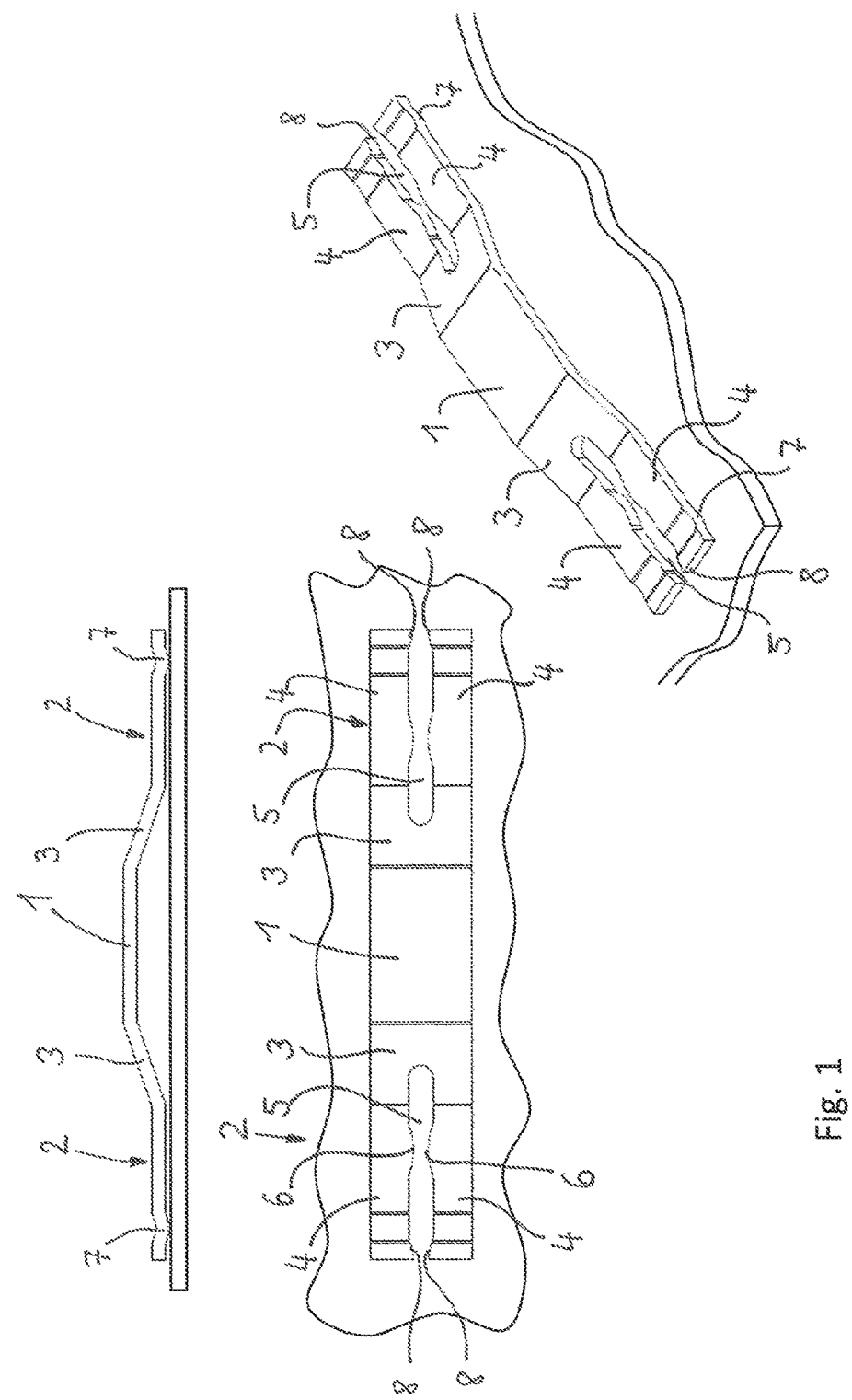
FIG. 1 illustrates a side view, a top view and a perspective view of a solder bridge in a fanned configuration with two bars.

The fanning generates two bars 4 (FIG. 1) or three bars 4 (FIG. 2) depending on the embodiment.

A respective slot 5 is provided between the bars 4.

In an embodiment shapes 6 are provided that originate from the bars 4 in a direction of free ends of the bars 4 and that extend into the slot 5.

These shapes 6 increase the surface of the bar 4 in the respective section and can be used as a contact surface for a soldering tool.

In a direction of the free ends the bars 4 include at least one bulge 7 which is used for forming a defined gap at a bottom side oriented to the conductive structure (not illustrated).

Figure 2:
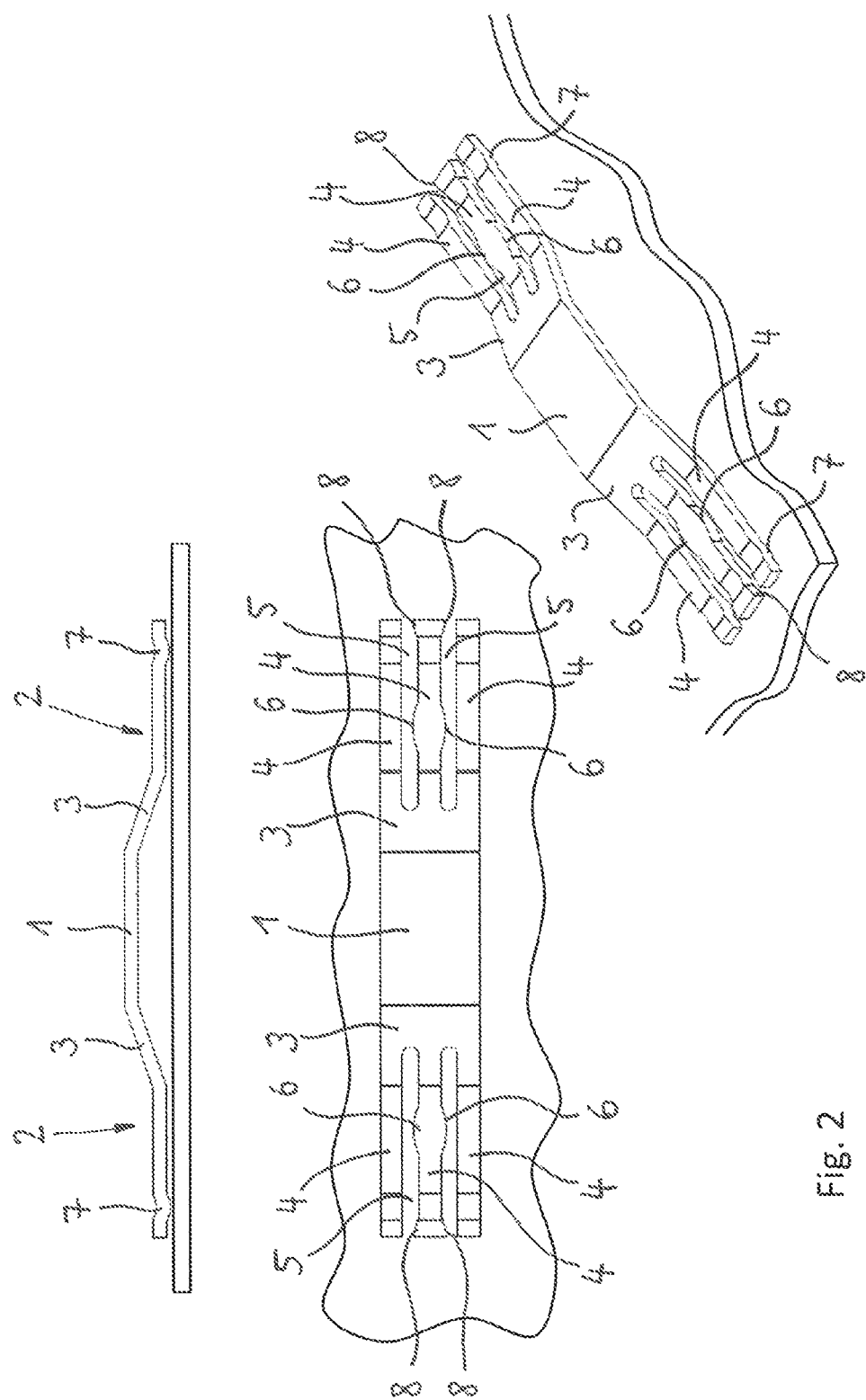
FIG. 2 illustrates a side view, a top view and a perspective view of a solder bridge in a fanned configuration with three bars.

According to the embodiment according to FIG. 2 the fanned area is made from three bars 4 with two slots 5.

In the variant according to FIG. 2, the center bar 4 includes the shapes that extend into the respective slot 5.

The bulge 7 forming a defined soldering gap is also configured at the bottom side.

Figure 3:
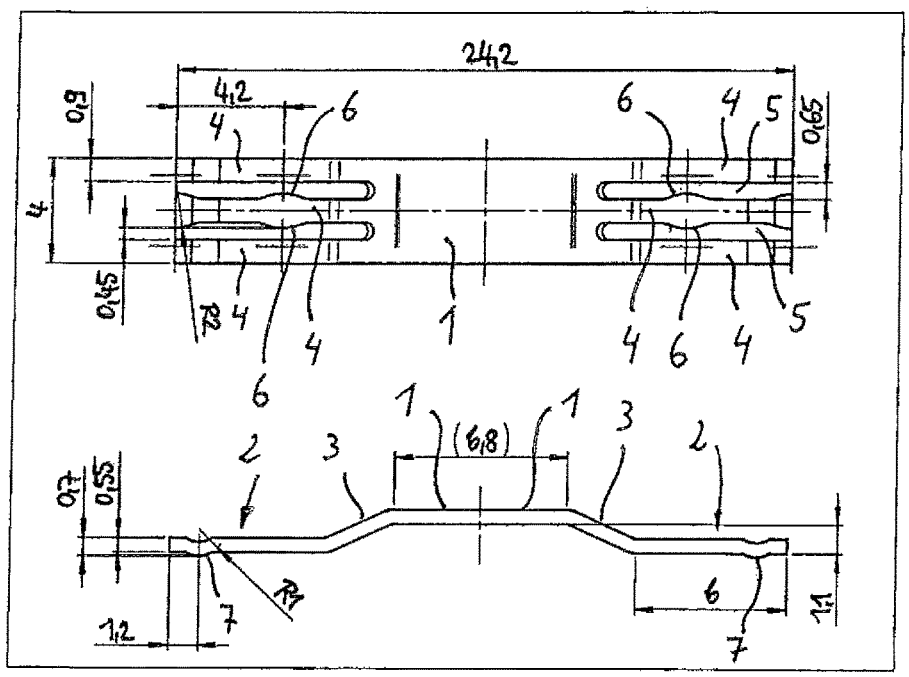
FIG. 3 illustrates a top view and a side view of a solder bridge with three bars per side and exemplary advantageous dimensions.

As evident from FIG. 3 with the respective exemplary dimensions the defined soldering gap is advantageously sized at 0.7 mm.

The bar width is for example at 0.9 mm. The total length of the solder bridge is 24 mm with an approximately 7 mm long connector element. The slot width is at approximately 0.45 mm for a total width of the solder bridge of 4 mm.

In the embodiments of the invention the free ends of at least one bar, in the embodiment according to FIG. 2 of the center bar, include an expanded section 8 that extends in a direction towards the slot.

This expansion section 8 prevents an interlocking of the bars when treating and supplying the soldering bases or a soldering bridge as individual pieces which simplifies handling when applying them to the respective carrier and subsequently performing hot air soldering.

When analyzing tensions that are generated during cooling after the soldering has been performed it has become evident that forces up to 45 MPa are generated by an exemplary 24 mm bridge without fanning structure. However, when a connector element according to the invention is used the occurring forces are in a range of less than 21 MPa for a soldering temperature of approximately 200 K.

SEQUENCE LISTING

Not Applicable

What is claimed is:

1. An electrical connector element for contacting a conductive structure arranged on a flat carrier wherein the contacting is performed by a thermally bonded connecting material, wherein devices for fixing an advantageously flexible conductor are arranged on one side, wherein the connector element is configured as a soldering base or soldering bridge with a connector portion,
characterized in that
at least a portion of the soldering base or of the soldering bridge that is to be connected with the conductive structure is configured as a fanned area, the fanned area including bars (4) and one or more slots (5), each of the one or more slots (5) having a width, at least some of the bars (4) being adjacent to one another to define adjacent bars (4), the adjacent bars (4) being offset by one of the one or more slots (5);
wherein at least two shapes (6) are formed on one or more of the adjacent bars (4) and disposed in lateral alignment with each other, the at least two shapes (6) extending laterally outwardly from the one or more adjacent bars (4) into the one or more slots (5) to reduce the width of the one or more slots (5); and
the free ends of at least one of the bars (4) include a wider section (8) extending in a direction of the one or more slots (5).

2. The electrical connector element according to claim 1, characterized in that
the bars (4) include at least one bulge (7) in a direction of free ends of the bars (4), wherein the bulge is provided to form a defined soldering gap at a bottom side oriented towards the conductive structure.

3. The electrical connector element according to claim 2, characterized in that
the solder gap is in a range of 0.5 mm to 0.7 mm.

4. The electrical connector element according to claim 3, characterized in that the solder gap is 0.7 mm.

5. The electrical connector element according to claim 1, characterized in that
the bars (4) of the fanned area include three bars (4); and the one or more slots (5) of the fanned area include two slots (5).

6. The electrical connector element according to claim 5, characterized in that
the center bar (4) includes one of the at least two shapes (6) that forms a contact surface for a soldering tool.

7. The electrical connector element according to claim 1, characterized in that
a width of the respective bars (4) is in a range of 0.2 mm to 2 mm.

8. The electrical connector element according to claim 7, characterized in that a width of the respective bars (4) is in a range between 0.4 mm and 0.9 mm.

9. The electrical connector element according to claim 1, characterized in that
a material thickness is in a range between 0.4 mm and 0.8 mm.

10. The electrical connector element according to claim 1, characterized in that
a minimum amount of a lead free connecting material is being used.

11. The electrical connector element according to claim 10, characterized in that
an amount of lead free connecting material is in a range of 2 $mm^3$ and 12 $mm^3$.

12. The electrical connector element according to claim 11, characterized in that an amount of lead free connecting material is in a range between 3 $mm^3$ and 6 $mm^3$.

13. The electrical connector element according to claim 1, characterized in that
the connector element is made from an iron-nickel or iron-chromium alloy or a mix thereof.

14. The electrical connector element according to claim 13, characterized in that
a difference of thermal expansion coefficients of the connector element and of the flat carrier is set to a minimum value.

15. The electrical connector element according to claim 1, characterized in that
the flat carrier is glass.

16. The electrical connector element according to claim 1, characterized in that a tension between the soldering base or solder bridge and the flat carrier is reduced by at least half compared to the non-fanned embodiment.

17. A use of an electrical connector element according to claim 1 to form the thermally bonded connection through hot air soldering.

* * * * *